Patented Apr. 9, 1940

2,196,300

UNITED STATES PATENT OFFICE 2,196,300

GELATIN

Donald P. Grettie, Chicago, Ill.

No Drawing. Application August 18, 1938,
Serial No. 225,571

23 Claims. (Cl. 99—130)

This invention relates to a method for improving the whipping qualities of gelatin which is to be used for edible or inedible purposes.

This application is a continuation in part of my copending application, Serial No. 115,808, filed December 14, 1936.

An important characteristic of gelatin used in marshmallow formulas and various formulas for producing inedible gelatin foam is the whipping quality.

One of the objects of the present invention is to provide a method for the improvement of the whipping qualities of gelatin for use in such products as marshmallows without the necessity of adversely affecting either the viscosity or the jelly strength of the gelatin.

Another object of the invention is to provide a new gelatin product of improved whipping qualities.

Other objects and purposes of the invention will be discussed in this specification.

The present invention contemplates a treatment of gelatin by the addition of salts or acids whose negatively charged polyvalent ions combine with the gelatin molecule. The hydrates of phosphorus pentoxide in all stages of complexity and the salts of the hydrates in all stages of complexity may be used in gelatin intended for edible purposes while molybdates, polymolybdates, tungstates, polytungstates, phosphotungstic acid, phosphotungstates, phosphomlybdic acid, and phosphomolybdates may be used in the treatment of gelatin intended for inedible purposes.

The present invention involves the addition of complex metaphosphates or complex metaphosphoric acids, such as hexametaphosphates or hexametaphosphoric acid to gelatin. The effect produced by the addition of small amounts of sodium hexametaphosphate to gelatin manufactured for use in marshmallow formulas is set out in Table A.

*Table A*

| Sample | Weight per gallon of marshmallow whip after the following time intervals | |
|---|---|---|
| | 8 minutes | 12 minutes |
| A marshmallow formula containing a sample of acid cured gelatin (control) | Pounds 3.27 | Pounds 2.84 |
| Same except gelatin was treated with 1 percent of sodium hexametaphosphate | 3.00 | 2.73 |
| Same except gelatin was treated with 2 percent of sodium hexametaphosphate | 2.84 | 2.60 |

It is apparent from Table A that the addition of sodium hexametaphosphate to gelatin causes the marsmallow formula containing gelatin so modified to whip to a lighter marshmallow than is otherwise the case. Furthermore, this treatment of the gelatin produces a much firmer and faster setting marshmallow.

The effect of the addition of sodium hexametaphosphate on certain important constants of the gelatin is set out in Table B.

*Table B*

| Sample | Jelly strength in grams (Bloom) | Viscosity in millipoises | pH | Ash |
|---|---|---|---|---|
| Acid cured gelatin | 230 | 43 | 4.12 | .55 |
| Same containing 0.5 percent sodium hexametaphosphate | 235 | 41 | 4.2 | 1.03 |
| Same containing 1.0 percent sodium hexametaphosphate | 229 | 40 | 4.2 | 1.83 |
| Same containing 2 percent sodium hexametaphosphate | 230 | 39 | 4.3 | 2.98 |

I have found that the beneficial effects of the addition of sodium hexametaphosphate to gelatin are greater with gelatin having a pH of 4.2 than with a gelatin having a pH of 6.5 or higher. The addition substance is equally effective when added to gelatin solution just before use in the marshmallow formula as when it is added to the gelatin liquor during the course of manufacture, before it is dried, redissolved, and added to a marshmallow formula.

I have found in practice that the addition of from 0.5 per cent to 5 per cent sodium hexametaphosphate based upon the dry weight of gelatin is particularly effective.

The effect produced by the addition of sodium orthophosphates and polyorthophosphates or complex orthophosphates when added to gelatin to be used in a marshmallow formula in amounts equivalent to 0.2 milliatom of phosphorous per gram of gelatin is set out in Table C.

*Table C*

| Sample | Weight per gallon of marshmallow whip after the following time intervals of whipping | |
|---|---|---|
| | 8 minutes | 12 minutes |
| Marshmallow formula containing acid cured gelatin (control) | Pounds 3.29 | Pounds 2.92 |
| Same except gelatin treated with sodium orthophosphate | 3.09 | 2.83 |
| Same except gelatin treated with sodium diorthophosphate | 3.03 | 2.8 |
| Same except gelatin treated with sodium triorthophosphate | 3.00 | 2.76 |
| Same except gelatin treated with sodium tetraorthophosphate | 2.87 | 2.68 |
| Same except gelatin treated with sodium hexaorthophosphate | 2.72 | 2.56 |
| Same except gelatin treated with sodium decaorthophosphate | 2.78 | 2.65 |

The phosphates enumerated in Table C are sodium salts of a series of acids known as polyorthophosphoric or complex orthophosphoric acids are derived from orthophosphoric acid by the elimination of molecules of water between two or more molecules of orthophosphoric acid. The derivation of triorthophosphoric acid, for example, may be represented by the following equation:
$$3H_3PO_4 \rightarrow H_5P_3O_{10} + 2H_2O$$

Another series of phosphoric acids known as ultraphosphoric acids and their salts are also effective for the purposes of this invention. The complex ultraphosphoric acids can be considered as derivatives of the hypothetical ultraphosphoric acid which has a formula $H_5PO_5$. The complex ultraphosphoric acids are derived by the elimination of molecules of water between two or more molecules of ultraphosphoric acid. The derivation of the hexaultraphosphoric acid, for example, may be represented by the following equation:
$$6H_5PO_5 \rightarrow H_{10}P_6O_{20} + 10H_2O$$

The present invention contemplates the use of metaphosphoric acid and the metaphosphates in all stages of complexity. When the metaphosphates are employed, the gelatin must be sufficiently acid to liberate metaphosphoric acid. A normal acid cured and cooked gelatin has sufficient acidity to liberate metaphosphoric acid from metaphosphates without any further addition of acid to the gelatin. Where an alkaline cured and cooked gelatin is employed, it is necessary to acidify the gelatin to secure the beneficial effects of the addition of a metaphosphate. However, the direct addition of a metaphosphoric acid to an alkaline cured gelatin gives beneficial effects.

Because of the instability of metaphosphoric acids in water solution, it is preferred to add the salts of such acids to an acid gelatin in order to liberate the respective acids in contact with the gelatin. Metaphosphoric acid and the metaphosphates readily obtainable on the market exist in various degrees of complexity, depending upon the manner of manufacture.

The present invention also contemplates the use of orthophosphoric acid, ultraphosphoric acid, orthophosphates, and ultraphosphates in all stages of complexity. The statements regarding the use of metaphosphoric acid and metaphosphates also apply in the use of the other phosphoric acids and phosphates.

As is well known, pure monometaphosphoric acid or its salts can only be obtained by the employment of very special procedures which are impracticable in commercial practice. I have found that the metaphosphates of higher degree of complexity are more effective than those of lower degree of complexity. This will be apparent from Table C and Table D which follows:

*Table D*

| Sample | Weight per gallon of marshmallow whip after the following time intervals | |
|---|---|---|
| | 8 minutes | 12 minutes |
| | Pounds | Pounds |
| Marshmallow formula containing an acid cured gelatin | 3.27 | 2.84 |
| Marshmallow formula containing an acid cured gelatin treated with 2 per cent of sodium trimetaphosphate | 3.00 | 2.78 |
| Marshmallow formula containing an acid cured gelatin treated with 2.0 percent of sodium hexametaphosphate | 2.84 | 2.60 |

I prefer to employ the water soluble salts of the hydrates or phosphorus pentoxide in all stages of complexity when the salts are employed. As has been pointed out, sodium hexametaphosphate is an especially effective salt. However, other salts may be employed whether water soluble or not.

In practice, the preferred procedure with alkaline reacting gelatin is to employ the hydrates of phosphorus pentoxides in all stages of complexity, whereas the preferred procedure with acid cured gelatin is to employ complex phosphates.

In inedible gelatin molybdates, tungstates, phosphotungstic acid and its salts, and phosphomolybdic acid and its salts may be employed even though these materials are poisonous and could not be used in edible gelatin. The effect of the addition of small amounts of these compounds to gelatin in a marshmallow formula which may be used for preparing an inedible foam is set out in Table E.

*Table E*

| Sample | Weight per gallon of marshmallow whip after the following time intervals of whipping | |
|---|---|---|
| | 8 minutes | 12 minutes |
| | Pounds | Pounds |
| Marshmallow formula containing acid cured gelatin | 3.29 | 2.92 |
| Same except gelatin treated with .2 milliatom of molybdenum in ammonium molybdate per gram of gelatin | 2.78 | 2.59 |
| Same except gelatin treated with .2 milliatom of tungsten in sodium tungstate per gram of gelatin | 2.96 | 2.87 |
| Same except gelatin treated with .05 milliatom of tungsten in phosphotungstic acid per gram of gelatin | 2.80 | 2.66 |
| Same except gelatin treated with .1 milliatom of molybdenum in phosphomolybdic acid per gram of gelatin | 2.96 | 2.74 |

The effect of the addition of small amounts of these compounds to the gelatin is similar to that obtained upon the addition of the edible phosphates or complex phosphates. Sodium molybdate and the polymolybdates, sodium polytungstates and sodium salts of phosphotungstic acid, and phosphomolybdic acid may also be employed to obtain the beneficial effects. Because of the poisonous nature of these materials, they cannot be employed in gelatin which is to be used for edible purposes.

The foundation acids, meta-, ortho-, and ultraphosphoric acids, are derived by hydration of phosphorus pentoxide with one, three, and five molecules of water, respectively. The complex acids, as explained before, are derived from the foundation acids by combination of two or more molecules of the foundation acids. Hexametaphosphoric acid is derived by combination of six molecules of metaphorphoric acid. Triorthophosphoric acid may be derived by the elimination of two molecules of water between three molecules of orthophosphoric acid. Hexaultraphosphoric acid may be derived by the elimination of ten molecules of water between six molecules of ultraphosphoric acid.

The term "hydrates of phosphorus pentoxide in all stages of complexity" is used herein to include the meta-, ortho-, and ultra- forms of phosphoric acid in all stages of complexity. Pyrophosphoric acid is considered to be diorthophosphoric acid derived by the elimination of one molecule of water between two molecules of orthophosphoric acid.

I claim:

1. The method of treating gelatin which comprises adding thereto a substance from the class consisting of the hydrates of phosphorus pentoxide in all stages of complexity, the salts of the hydrates in all stages of complexity, molybdates, polymolybdates, tungstates, polytungstates, phosphotungstic acid, phosphotungstates, phosphomolybdic acid, and phosphomolybdates.

2. The method of treating gelatin which comprises adding thereto a substance from the class consisting of the hydrates of phosphorus pentoxide in all stages of complexity and the salts of the hydrates in all stages of complexity.

3. The method of treating gelatin which comprises adding thereto a substance from the class consisting of the metaphosphoric acids and the metaphosphates.

4. The method of treating gelatin which comprises adding a metaphosphoric acid thereto.

5. The method of treating gelatin which comprises adding metaphosphates thereto.

6. The method of treating gelatin which comprises adding hexametaphosphoric acid thereto.

7. The method of treating gelatin which comprises adding a hexametaphosphate thereto.

8. The method of treating gelatin which comprises adding sodium hexametaphosphate thereto.

9. The method of treating gelatin which comprises adding a solution of a metaphosphate thereto.

10. The method of treating an acid gelatin which comprises adding metaphosphates thereto.

11. The method of treating an acid gelatin which comprises adding a hexametaphosphate thereto.

12. The method of treating an acid gelatin which comprises adding sodium hexametaphosphate thereto.

13. The method of treating gelatin which comprises acidifying the gelatin and adding metaphosphates thereto.

14. The method of treating gelatin which comprises acidifying the gelatin and adding a hexametaphosphate thereto.

15. The method of treating gelatin which comprises acidifying the gelatin and adding sodium hexametaphosphate thereto.

16. An improved gelatin product comprising gelatin and a substance selected from the class consisting of the hydrates of phosphorus pentoxide in all stages of complexity, the salts of the hydrates in all stages of complexity, molybdates, polymolybdates, tungstates, polytungstates, phosphotungstic acid, phosphotungstates, phosphomolybdic acid, and phosphomolybdates.

17. An improved gelatin product comprising gelatin and a substance selected from the class consisting of the hydrates of phosphorus pentoxide in all stages of complexity and the salts of the hydrates in all stages of complexity.

18. An improved gelating product comprising gelatin and a substance selected from the class consisting of metaphosphoric acids and metaphosphates.

19. An improved gelatin product comprising gelatin and a metaphosphoric acid.

20. An improved gelatin product comprising gelatin and a water soluble salt of a metaphosphoric acid.

21. An improved gelatin product comprising gelatin and sodium hexametaphosphate.

22. A marshmallow product comprising gelatin and a substance selected from the class consisting of the hydrates of phosphorus pentoxide in all stages of complexity and the salts of the hydrates in all stages of complexity.

23. A marshmallow product comprising gelatin and a substance selected from the class consisting of metaphosphoric acids and metaphosphates.

DONALD P. GRETTIE.

CERTIFICATE OF CORRECTION.

Patent No. 2,196,300.                  April 9, 1940.

DONALD P. GRETTIE.

It is hereby certified that error appears in the printed specification of the above numbered patent requiring correction as follows: Page 2, second column, line 2, for the word "or" read --of--; page 3, second column, line 23, claim 18, for "gelating" read --gelatin--; and that the said Letters Patent should be read with this correction therein that the same may conform to the record of the case in the Patent Office.

Signed and sealed this 25th day of June, A. D. 1940.

(Seal)                        Henry Van Arsdale,
                               Acting Commissioner of Patents.

CERTIFICATE OF CORRECTION.

Patent No. 2,196,300. April 9, 1940.

DONALD P. GRETTIE.

It is hereby certified that error appears in the printed specification of the above numbered patent requiring correction as follows: Page 2, second column, line 2, for the word "or" read --of--; page 3, second column, line 23, claim 18, for "gelating" read --gelatin--; and that the said Letters Patent should be read with this correction therein that the same may conform to the record of the case in the Patent Office.

Signed and sealed this 25th day of June, A. D. 1940.

(Seal)

Henry Van Arsdale,
Acting Commissioner of Patents.